United States Patent [19]

Ono

[11] Patent Number: 5,148,028
[45] Date of Patent: Sep. 15, 1992

[54] MECHANISM FOR FEEDING RADIATION IMAGE STORAGE PANEL FROM CASSETTE TO READ-OUT MEANS

[75] Inventor: Hiroshi Ono, Hadano, Japan

[73] Assignee: Fuji Photo Film Co., Ltd., Kanagawa, Japan

[21] Appl. No.: 747,473

[22] Filed: Aug. 13, 1991

Related U.S. Application Data

[63] Continuation of Ser. No. 634,817, Jan. 2, 1990, abandoned, which is a continuation of Ser. No. 534,374, Jun. 7, 1990, abandoned, which is a continuation of Ser. No. 445,102, Dec. 7, 1989, abandoned, which is a continuation of Ser. No. 330,949, Mar. 27, 1989, abandoned, which is a continuation of Ser. No. 219,847, Jul. 11, 1988, abandoned, which is a continuation of Ser. No. 39,691, Apr. 20, 1987, abandoned.

[30] Foreign Application Priority Data

Apr. 19, 1986 [JP] Japan ................................ 61-90611

[51] Int. Cl.⁵ .............................................. G03B 42/00
[52] U.S. Cl. ................................................ 250/327.2
[58] Field of Search ................ 250/327.2 J, 484.1 B; 414/411; 271/9; 53/266 C, 381 R, 382

[56] References Cited

U.S. PATENT DOCUMENTS

| | | | |
|---|---|---|---|
| 4,163,499 | 8/1979 | Schmidt | 414/411 |
| 4,324,480 | 4/1982 | Nomura et al. | 354/320 |
| 4,480,423 | 11/1984 | Müller | 53/266 R |
| 4,553,369 | 11/1985 | Debes et al. | 53/55 |

FOREIGN PATENT DOCUMENTS 2578519  9/1986  France ................................ 414/411

Primary Examiner—Constantine Hannaher
Attorney, Agent, or Firm—Sixbey, Friedman, Leedom & Ferguson

[57] ABSTRACT

A mechanism for feeding a radiation image storage panel from a cassette to a read-out means is provided which comprises a cassette for keeping therein the image storage panel which has a panel release part; a tray which receives thereon plural panels in such manner that the panel release part of each cassette is positioned downward; a cassette lock release means having a means to give an action to the cassette to open the panel release part so that the panel in the cassette is dropped down; a moving means for moving the tray or cassette lock release means, and a guide member for receiving the dropped panel and guiding the panel to the read-out means.

3 Claims, 4 Drawing Sheets

MECHANISM FOR FEEDING RADIATION IMAGE STORAGE PANEL FROM CASSETTE TO READ-OUT MEANS

This application is a continuation of Ser. No. 07/634,817, filed Jan. 2, 1990, now abandoned, which was a continuation of Ser. No. 07/534,374, filed Jun. 7, 1990, now abandoned, which was a continuation of Ser. No. 07/445,102 filed Dec. 7, 1989, now abandoned, which was a continuation of Ser. No. 07/330,949, filed Mar. 27, 1989, now abandoned, which was a continuation of Ser. No. 07/219,847, filed Jul. 11, 1988, now abandoned, which was a continuation of Ser. No. 07/039,691, filed Apr. 20, 1987, now abandoned.

BACKGROUND OF THE INVENTION

1. Field of Invention

The present invention relates to a method of feeding radiation image storage panels utilizing a stimulable phosphor to a device for use in carrying out a radiation image recording and reproducing method which uses said panels.

2. Description of Prior Art

It is known that when certain phosphors are irradiated with a radiation such as X-rays, $\alpha$-rays, $\beta$-rays, $\gamma$-rays, electron beam or ultraviolet rays, part of radiation energy is stored in the phosphors and subsequently the phosphors emit stimulated emission in proportion to the amount of the stored energy when irradiated with stimulating rays such as visible light. The phosphor having the above-described properties is called stimulable phosphor. There have been proposed in our co-pending Japanese patent provisional publication Nos. 55(1980)-12429, 56(1981)-11395, 55(1980)-163472, 56(1981)-104645 and 55(1980)-116340, radiation image recording and reproducing system wherein the radiation image of an object such as a human body is recorded on a radiation image storage panel (i.e., stimulable phosphor sheet) having a sheet-form stimulable phosphor layer by utilizing the above stimulable phosphor, said panel is scanned with stimulating rays such as laser beam to emit stimulated emission, the stimulated emission is photoelectrically read out to obtain signals of the image and the radiation image of the object is reproduced from the signals as a visible image on CRT or a recording material such as radiographic material.

The panel does not record finally the image information, but retains temporarily the image information to give an image the final recording medium. Radiation energy remaining on the panel after reading out stimulated emission can be released by exposing the panel to light or heat to erase the remaining radiation image from the panel. In this way, the panel can be repeatedly used. Such repeated application of the panel is very advantageous in an economical viewpoint.

In the above-described system, the panel is generally placed in a cassette kept in a light-shielded condition. After a radiation image is recorded, the panel placed in the cassette is placed in an image read-out device, and the panel is then taken out of the cassette and fed to a read-out section of the device.

In a conventional image read-out device, only one cassette can be place in a panel feed part thereof. Hence, when the read-out operation of image-recorded panels is to be successively performed, for instance, when the read-out operation of panels which have been successively recorded in a recording device is to be performed in sequence, there must be repeatedly performed an operation comprising placing a cassette containing an image-recorded panel in the panel feed part, releasing the panel from the cassette, taking the cassette out of the panel feed part after completion of the read-out, and subsequently placing in the panel feed part the next cassette containing an image-recorded panel. Thus, there are disadvantages that operators must stand by and wait for the next panel until the examination of the previous panel is completed, much time is required for replacing one cassette with another one and hence, the replacing operation is complicated and inefficient.

There is known an image read-out device wherein a stacker is provided between the panel feed part and the read-out section, each panel is taken out of each cassette and the panels are temporarily piled up to allow them to stand by. The panels must be taken out in order of arrival so that the mechanism of the stacker becomes complicated, cost increases and the size of the read-out device itself becomes larger. Further, the panels in the state of a pile are placed in the stacker. Thus, the panels are rubbed against each other so that the panel surfaces are sometimes damaged and the life of the panel is shortened.

SUMMARY OF THE INVENTION

It is an object of the present invention to provide a mechanism and a method for feeding radiation image storage panels, which allows the radiation image recording and reproducing method to be carried out more efficiently.

The mechanism of the invention generally comprises:

a cassette for keeping a radiation image storage panel which is provided with a panel release part which is opened by a lock, a tray which receives plural radiation image storage panels such that the panel release part of each cassette is positioned downward, a cassette lock release means for opening and closing said cassette lock, a moving means for moving the tray or the cassette lock release means to move the cassette lock release means in an operative position with respect to a desired cassette, and a guide member for receiving the dropped panel and for guiding the panel to the read-out means.

The present invention also resides in a method of feeding radiation image storage panels comprising the steps of:

placing at least two cassettes, each cassette retaining a radiation image storage panel therein and being provided with a panel release part and capable of releasing the retained panel by externally driven operation, in such a manner that panel release part is positioned downward;

interlocking an auxiliary means for panel release with the cassettes in a given order for opening the cassettes at the panel release parts; and releasing the panels in the order from the cassettes by allowing the panels to drop through the panel release parts.

The radiation image recording and reproducing method can be carried out more efficiently by using the method of feeding radiation image storage panels according to the present invention.

In the method of feeding radiation image storage panels according to the invention, a plurality of cassettes containing panel are fed to a panel feed part in such a manner that their opening parts are positioned downward. Many cassettes can be transferred in one lot and placed in the panel feed part by one operation. Accordingly, it is not necessary the cassettes are placed in the panel feed part one by one as in the conventional system.

The release of the panels from the plural cassettes can be carried in a very simple manner by interlocking a panel release auxiliary means with the cassettes in a given order to release the panel and allowing the panels within the cassettes to drop in the given order.

By utilizing the method of feeding the radiation image storage panels according to the invention, the radiation image read-out device can be always operated even under such conditions that recording time varies irregularly in the radiation image recording system so that operation efficiency can be improved, whereby the overall processing rate including the recording operation and the read-out operation can be increased. In more detail, the overall efficiency of processing of the radiation image recording and reproducing system which comprises difference in processing rate between various means constituting said system and variation in the processing rates of the various means can be improved by using the method of the present invention.

Further, the release of the panels from the cassettes loaded on the panel feed part can be carried out in a desired order irrespective of the order of the recording on the panels (i.e., the order of examination) by using the method of the present invention, whereby the read-out operation of a radiation image on a specific panel can be preferentially carried out. Thus, a demand for quickly observing the radiation image of a specific patient can be satisfied.

BRIEF DESCRIPTION OF THE DRAWINGS

FIG. 3-A is a perspective view showing an embodiment of a cassette lock means of FIG. 3.

FIG. 4-A is a sectional view taken along the line I—I in FIG. 4.

DETAILED DESCRIPTION OF THE INVENTION

A method of feeding radiation image storage panels according to the present invention will be described in more detail by referring to FIG. 1 which schematically shows an embodiment of a radiation image read-out device for use in reproducing a radiation image which has been already recorded on a radiation image storage panel by a radiographic recording process.

Figure 1:
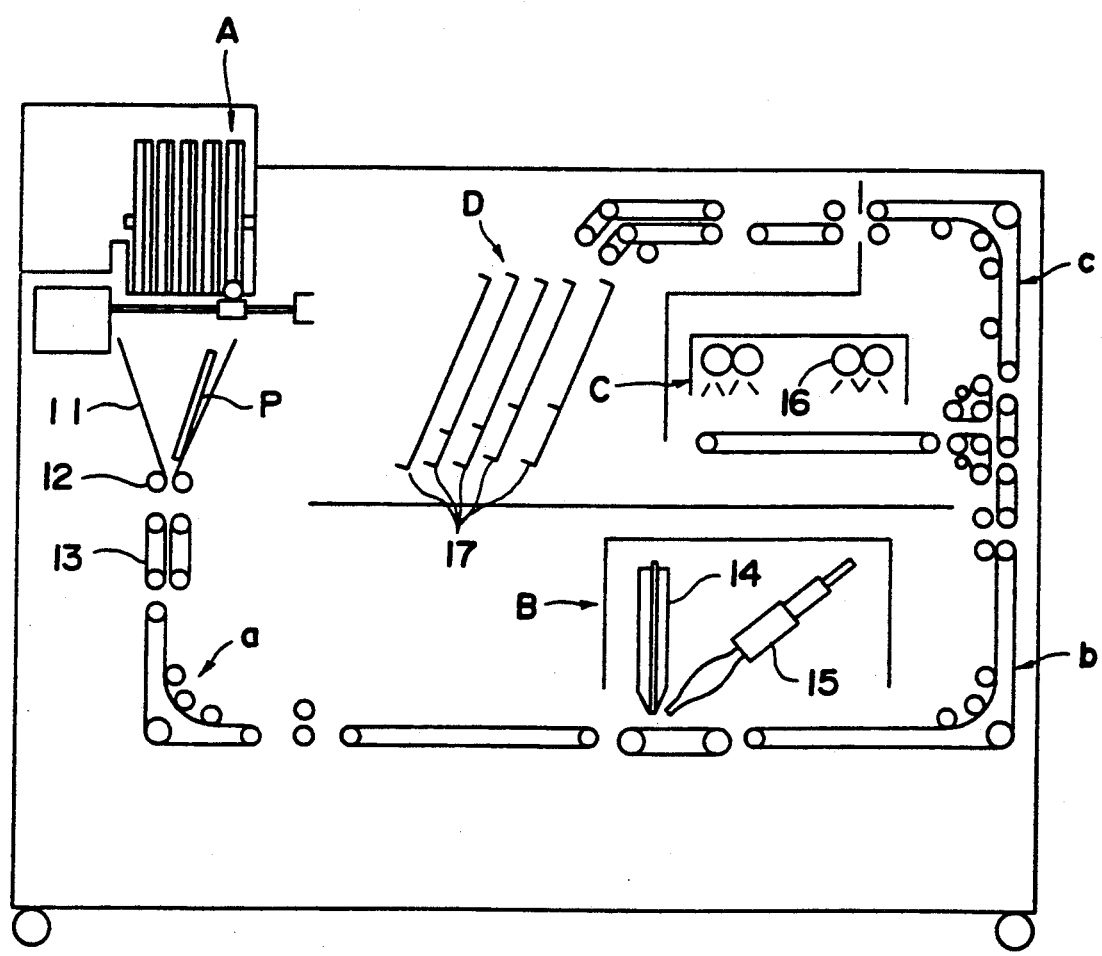
FIG. 1 schematically shows an embodiment of a radiation image read-out device which is utilized for performing a method of feeding radiation image storage panels according to the present invention.

FIG. 1 schematically shows a representative internal arrangement of a radiation image read-out device.

A conventional radiation image read-out device is provided with a radiation image storage panel feed part A, a read-out section B, a remaining energy-erasing section C, a processed panel piling tray D, and transfer systems a, b, and c as shown in FIG. 1.

A radiation image storage panel placed in a cassette and containing a radiation image recorded thereon in a recording device (not shown) as such is placed in the panel feed part A. The panel P is then released from the cassette, allowed to drop into guide member 11 and transferred to the read-out section B by means of the transfer system a comprising a pair of rollers 12, conveyor belt 13, etc. In the read-out section B, the radiation image recorded on the panel is read out by a read-out means having a photoelectrical read-out function. The read-out means comprises stimulating ray irradiation device 14 including a laser beam generating means and detection means 14 including a photomultiplier for detecting stimulated emission emitted by the panel. The read-out operation of the panel is carried out in the read-out section B using the stimulating ray irradiation device 14 and the detection means 15.

The image information photoelectrically read out is then reproduced as a visible image on a display device such as CRT or an image recording device using a radiographic material.

After the completion of the read-out operation, the panel is conveyed to the erasing section C by means of the transfer system b. In the erasing section C, there is conducted an erasing operation for erasing the radiation image (i.e., stored radiation energy) remaining on the panel. The erasing operation is carried out by irradiating the panel with erasing rays given by erasing ray source 16. After the erasing operation, the panel can be repeatedly used for the recording of a radiation image.

After the erasing operation, the panel P is conveyed to the processed panel piling tray D by means of the transfer system c, classified into one of a plurality of tray 17 according to the size of the panel P and piled up.

A feeding device for use in carrying out a method of feeding radiation image storage panels according to the present invention which are arranged in the panel feed part A, will be described in more detail by referring to FIG. 2, etc.

Figure 2:
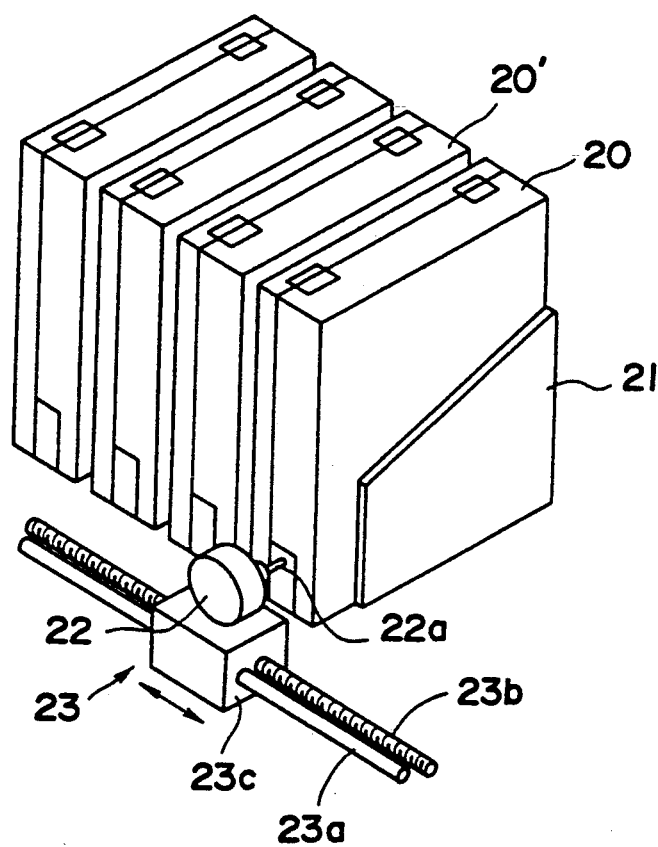
FIG. 2 schematically shows an embodiment of a feeding device for use in performing a method of feeding radiation image storage panels according to the invention.

FIG. 2 is a perspective view showing an embodiment of a radiation image storage panel feeding device which can be used in the present invention.

The radiation image storage panel feeding device comprises tray member 21 for receiving a plurality of cassettes 20, 20′, . . . ; cassette lock release means (i.e., panel release auxiliary means) 22 which is to be interlocked with the cassette 20 to open a lid thereof; and moving means 23 for moving the cassette lock release means 22 to open in order the lids of the cassettes 20, 20′, . . . .

The cassette 20 retaining panel and received in the tray member 21 will be described below in more detail.

Figure 3:
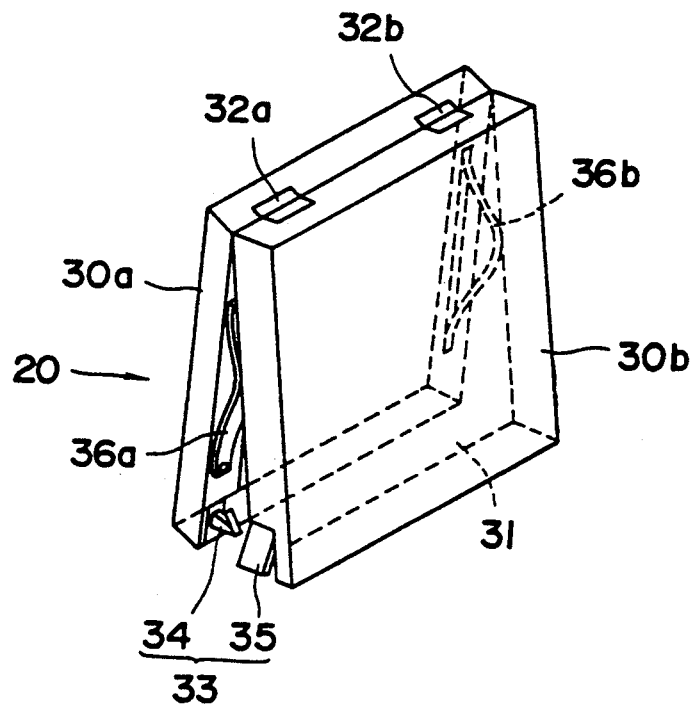
FIG. 3 is a perspective view showing an embodiment of the structure of a cassette to be used for a method of feeding radiation image storage panels according to the invention.
Figure 3:
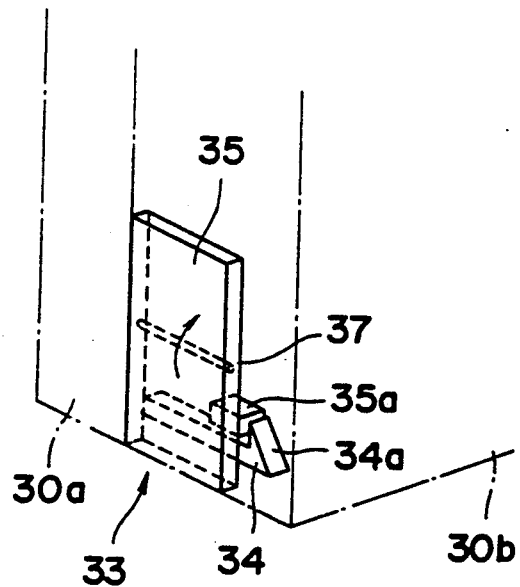

FIG. 3 is a perspective view showing the cassette 20, In FIG. 3, the cassette is shown in the opened form to better understand the structure of the cassette.

The cassette 20 comprises housing member 30a and lid member 30b. The housing member 30a and the lid member 30b are joined in a swingable manner by means of hinges 32a and 32b in such a manner that an opening (discharge part 31) is formed at one end. A recessed part is provided on each of the inside surface of the housing member 30a and the inside surface of the lid member 30b so that they are co-operated to form a panel retaining part when the cassette is closed. Cassette lock means 33 comprising hook member 34 and interlocking member 35 is provided in the vicinity of the discharge part 31 and the member 34 provided at one end of the housing member 30a and the member provided at one end of the lid member 30b are opposed to each other.

Referring to FIG. 3-A, the hook member 34 is fixed to the housing member 30a at about right angles and the top thereof has lock part 34a. The interlocking member 35 has protrusion 35a on the back thereof and turns on its central axis 37 in the direction of an arrow. The interlocking member 35 is supported by spring (not shown) so that the member 35 is kept approximately on the same plane as that of the side of the lid member 30b. The lock part 34a is locked by the protrusion 35a, while the hook member 34 is co-operated with the interlocking member 35. By the interlocking of the hook member 30a with the interlocking member 35, the housing member 30a is closely joined to the lid member 30b, whereby the cassette is kept in a light-shielded state and retains the panel therein.

Unlocking of the interlocked cassette lock means 33 can be made by pressing the upper part of the interlocking member 35 by external force (cassette lock release means). The interlocking member 35 turns on its central axis 37 by external force so that the protrusion 35a and the lock part 34a are released from each other.

As shown in FIG. 3, leaf springs 36a and 36b are provided at both end sides on which the housing member 30a and the lid member 30b are brought into contact with each other. The leaf springs 36a and 36b are operated so that the housing member 30a and the lid member 30b in the joined state are separated from each other, that is, the cassette is opened. The opening by the action of the springs is conducted at the same time when the interlocking of the hook member 34 with the interlocking member 35 is released. The leaf springs 36a and 36b may be provided on any of the joint surfaces of the housing member 30a and the lid member 30b. The leaf springs may be replaced with other member having a function capable of separating the housing member 30a and the lid member 30b from each other. For instance, magnets may be used.

The cassette is by no means limited to the above-described cassette comprising a housing member and a lid member as shown in FIG. 3. Other type may be used. For instance, there may used a box type cassette on one side of which a hinged lid member is provided as disclosed in our co-pending Japanese patent application No. 60(1985)-234183, or a cassette wherein an opening is provided at one end and a sheet-form sheet-holding member is provided within a flat box as described in our co-pending Japanese patent application No. 61(1986)-56182.

The tray member 21 has a function capable of receiving a plurality of cassettes 20, 20', ... and such a structure that the dropping of the panel P from the opening formed on the under side of the cassette is not prevented. For instance, the bottom of the tray member has an opened structure except that a support frame is provided so as not to allow the cassette itself to drop. The tray member 21 has such a structure that the planes of the cassettes 20 (lid member or housing member) are placed in the opposite manner and in a parallel state. The cassettes are arranged at slight intervals in the same direction (for instance, the lid member is on the right side).

The cassette lock release means 22 comprises an electromagnetic solenoid and has such a function that the top part 22a is protruded by an external instruction, whereby the upper part of the interlocking member of the cassette lock release means is pushed by shock.

The moving means 23 is connected to the cassette lock release means 22 and has a function capable of moving said means 22 in parallel to the end parts of the cassettes placed in the tray member 21. The moving means 23 comprises a guide bar 23a, a screw bar 23b and a moving part 23 on which the cassette lock release means 22 is placed. The moving part 23c is movably arranged along the guide bar 23a. A driving source for moving said part may be provided within the moving part itself, or may be externally provided so that it is connected to the screw bar 23b to allow the screw bar 23b itself to rotate.

The cassette lock release means 22 can be moved in parallel by the moving means 23 so as to allow it to be interlocked with all cassettes placed in the tray member.

The function of the feeding device of the radiation image storage panel will be described below in more detail by referring to FIG. 4 and FIG. 4a.

Figure 4:
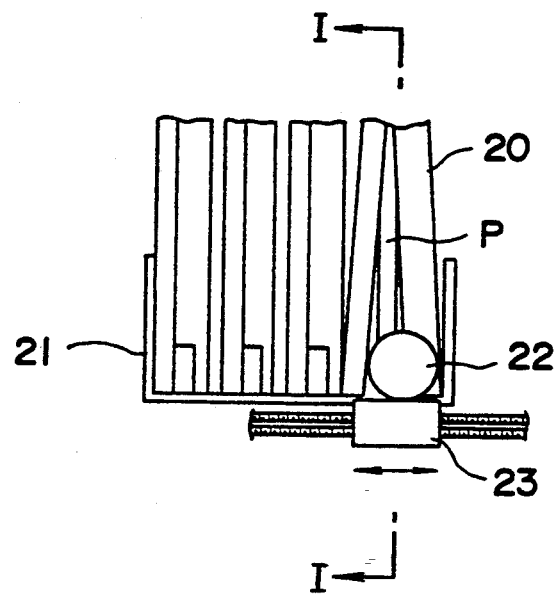
FIG. 4 is a front view showing a state where a cassette lock release means is interlocked with a cassette lock means.
Figure 4:
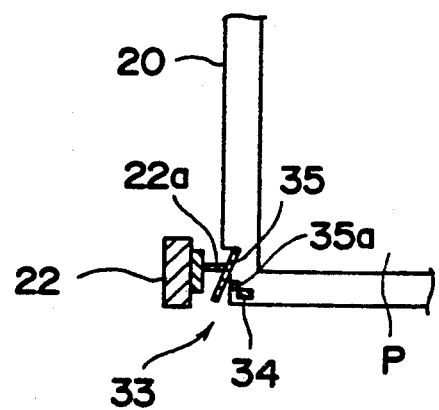

FIG. 4 is a front view showing a state where the cassette lock release means 22 is interlocked with the cassette lock means 33 for the cassettes 20 placed on the tray member 21. FIG. 4-A is a sectional view taken along the line I—I in FIG. 4.

In opening a predetermined cassette 20, the cassette lock release means 22 is moved under the cassette 20 by the moving means 23, and the top 22a of said means 23 is interlocked with the interlocking member 35 of the cassette 30, whereby the hook member 34 is released and the lid member 30b is opened to thereby release the retention of the panel P and to form the discharge part 31 as described above. The panel P is allowed to drop by its own weight. In this way, the panel can be easily released.

Thus, when an arbitrary cassette is subjected to the above-described operation, an arbitrary panel can be released in a desired order.

The panel P released from the cassette 20 is guided by the guide member 11, conveyed by the transfer system a, and subjected to the read-out operation and the erasing operation.

The tray member having a function capable of receiving a plurality of the cassettes is by no means limited to the tray member of FIG. 2 wherein two or more cassettes are vertically arranged in parallel to each other in such a manner that their planes are opposite to each other. Other member may be used. For instance, there may be used a disk type member wherein the cassettes are radially placed, or a member wherein the cassettes are arranged by suspending or retaining them at the upper part or side part thereof.

In the above-described embodiment of the feeding device which is utilized for performing the method of feeding the radiation image storage panels according to the present invention, the cassette lock release means has a moving function. However, the present invention is not limited thereto. Other arrangement may be used in the present invention. For instance, the tray member for the cassettes may have the moving function. Alternatively, there may be such a structure that both means may be relatively movable.

I claim:

1. A mechanism for feeding a radiation image storage panel from a cassette to a read-out means, comprising:

a cassette for keeping therein a radiation image storage panel which is provided with a panel release part which is closed by a lock but opened when the lock is opened by a predetermined action;

a tray which receives thereon plural radiation image storage panels in such manner that the panel release part of each cassette is positioned downward;

a cassette lock release means having a means to give the predetermined action to the cassette to open the panel release part so that the radiation image storage panel kept therein is released and dropped down;

a moving means for moving the tray or the cassette lock release means so that the cassette lock release means is arranged at a position where the cassette lock release means applies to the panel release part of any desired cassette the predetermined action to open the panel release part; and a guide member for receiving the dropped panel and guiding the panel to the read-out means.

2. The mechanism as defined in claim 1, wherein the cassette comprises a housing member and a lid member, these members being hinged on one side and being interlocked temporarily on another side to give the panel release part.

3. The mechanism as defined in claim 1, wherein the panel release part has a swingable member and the cassette lock release means has an electromagnetic solenoid to push the swingable member.

* * * * *